United States Patent [19]

Laramay

[11] Patent Number: 5,320,171
[45] Date of Patent: Jun. 14, 1994

[54] METHOD OF PERVENTING GAS CONING AND FINGERING IN A HIGH TEMPERATURE HYDROCARBON BEARING FORMATION

[75] Inventor: Mary A. H. Laramay, Duncan, Okla.

[73] Assignee: Halliburton Company, Duncan, Okla.

[21] Appl. No.: 960,472

[22] Filed: Oct. 9, 1992

[51] Int. Cl.$^5$ ............................................. E21B 33/00
[52] U.S. Cl. ..................................... 166/285; 166/292
[58] Field of Search ............... 166/270, 275, 285, 292, 166/295

[56] References Cited

U.S. PATENT DOCUMENTS

| | | |
|---|---|---|
| 2,713,906 | 7/1955 | Allen . |
| 3,616,858 | 11/1971 | Raza . |
| 3,695,356 | 10/1972 | Argabright et al. . |
| 3,700,031 | 10/1972 | Germer, Jr. et al. ............... 166/270 |
| 3,779,315 | 12/1973 | Boneau . |
| 3,866,682 | 2/1975 | Jones et al. ......................... 166/285 |
| 4,004,639 | 1/1977 | Sandiford ...................... 166/270 X |
| 4,113,014 | 9/1978 | Kubens et al. . |
| 4,332,297 | 6/1982 | Sandiford . |
| 4,413,680 | 11/1983 | Sandiford et al. . |
| 4,444,265 | 4/1984 | Schmidt . |
| 4,532,052 | 7/1985 | Weaver et al. ................. 166/275 X |
| 4,534,412 | 8/1985 | Dovan et al. . |
| 4,694,906 | 9/1987 | Hutchins et al. . |
| 4,856,588 | 8/1989 | Borchardt . |

OTHER PUBLICATIONS

D. Dalrymple, D. Sutton and P. Creel, "Conformance Control in Oil Recovery," technical paper of Halliburton Services.

Injectrol Services, Halliburton Service Water Control Services Technical Data.

*Primary Examiner*—William P. Neuder
*Attorney, Agent, or Firm*—Arnold, White & Durkee

[57] ABSTRACT

A method of preventing gas coning or fingering from a gas cap in an oil producing well is provided. A silicate solution and a delayed activator are injected into the gas cap under conditions such that the activator causes the silicate to gel after a predetermined period of time to form a substantially impermeable zone or layer above the oil bearing formation to prevent gas from flowing into the oil well during production.

2 Claims, No Drawings

METHOD OF PERVENTING GAS CONING AND FINGERING IN A HIGH TEMPERATURE HYDROCARBON BEARING FORMATION

BACKGROUND

The present invention relates to methods of preventing gas coning and gas fingering in high temperature hydrocarbon bearing formations. More particularly, the present invention relates to methods of preventing gas coning or fingering using high temperature sealants.

Many hydrocarbon bearing formations contain gas as well as oil. Because of its lower density, the gas accumulates at the top of a reservoir and forms what is often called a gas cap.

Usually it is desirable to preferentially produce oil from a formation containing both gas and oil. This is accomplished by cementing the casing through the formation and perforating it only opposite the oil zone. However, there is often a considerable amount of vertical permeability whereby gas is drawn down into the oil bearing portion of the formation as the pressure is reduced when oil flows into the production tubing. When this occurs around the well bore to create an inverted cone shaped volume, it is generally referred to a gas coning. Gas can also preferentially flow through areas of higher permeability such as fractures. When gas flows through these areas into the oil bearing portion of the formation, it is often referred to as fingering.

A number of methods have been developed in an attempt to reduce or solve the problem of gas coning. One such method is disclosed in U.S. Pat. No. 2,713,906. The method disclosed in this patent attempts to selectively block the formation approximately at the plane of the interface between the normal upper surface of the liquid oil and the overlaying gas cap. This blocking or plugging is achieved by localized, selective deposition of an asphaltic or bituminous material at the liquid-gas interface. This is accomplished by injecting asphaltic material into the formation just below the liquid surface as an asphalt-rich solution in an organic solvent or diluent compatible with the reservoir oil and from which the asphaltic substance is precipitated by contact with the reservoir gas. A sufficient amount of the solvent-asphalt solution is injected to displace the reservoir oil a substantial distance in a radial direction from the well bore at the oil-gas interface. The solvent-asphalt solution thereby makes contact with the reservoir gas at the interface and the asphalt is deposited from the solution.

Another method which has been proposed to prevent or reduce gas coning involves the injection of foams into the hydrocarbon bearing formation. Such a process is disclosed in U.S. Pat. No. 3,616,858. According to this process, an MQ-type silicone is pumped into the hydrocarbon bearing formation. The silicone is a foaming agent which can simply be pumped down the well into the entire oil producing formation or it can be pumped into a disk-shaped volume at the oil-gas interface by isolating a portion of the well with packers. As gas tries to flow through the silicone, the gas causes the silicone to foam, thus inhibiting further flow.

Still a further method of preventing gas coning is disclosed in U.S. Pat. No. 3,779,315. This method involves the injection of a polymeric solution into the hydrocarbon containing formation at a location lower in elevation than the gas cap. Preferably, gas is removed from the gas cap during injection to facilitate movement of the polymeric material up into the zones of high permeability between the gas cap and the lower oil bearing portion of the formation. Preferred polymers include partially hydrolyzed polyacrylamides, polysaccharide carboxylmethyl cellulose and polyethylene oxide. Water is at least intermittently injected into the gas cap above the deposited polymer layer as oil is subsequently produced from the bottom of the formation.

Other attempts have been made to reduce gas coning and fingering using technology developed to prevent water coning in hydrocarbon bearing formations. For example, INJECTROL®U, a product of Halliburton Services, has been injected into low temperature wells to prevent gas coning. INJECTROL®U is a sodium silicate solution which uses urea as an activator. However, it was discovered that INJECTROL®U with urea set too fast to be used in high temperature wells since there was not sufficient time to pump in enough sealant to get deep penetration.

While these methods have experienced some success they each have their limitations and disadvantages. Accordingly, it would be an advancement in the art to provide a method for preventing gas coning and fingering in which the substance being injected had a substantial depth of penetration to provide a large area of low permeability. It would be a further advancement to provide a system that was thermally stable at higher temperatures. Such a method is disclosed and claimed herein.

SUMMARY OF THE INVENTION

The present invention provides a method of preventing gas coning and fingering in hydrocarbon bearing formations containing both oil and gas. In a preferred embodiment, a water soluble sodium silicate such as INJECTROL®U is pumped into the gas cap with a time delayed activator to form an essentially impermeable zone or layer above the oil bearing zone. One such activator is a low molecular weight urea/formaldehyde resin. The resin decomposes at high temperatures to form urea which activates the setting of the silicate solution.

DETAILED DESCRIPTION OF THE PREFERRED EMBODIMENTS

The present invention provides methods for treating high temperature hydrocarbon bearing formations in order to decrease or eliminate gas coning and fingering that occur during production of oil through a well bore. As used in the context of this invention, high temperature formations are those with temperatures above about 250° F. The invention is particularly useful in formations having temperatures above about 300° F.

The present invention involves the injection of a silicate solution and time delayed activator into the gas cap above the oil bearing zone adjacent the well bore. The activator causes the silicate to gel and form an essentially impermeable zone or layer.

As used herein, an impermeable zone or layer does not mean an area through which no gas can flow. Rather, it refers to an area in which the gas permeability has been reduced significantly as compared to the horizontal permeability of the formation with respect to oil so as to reduce or eliminate gas coning and fingering when oil is produced.

In the preferred embodiment, the silicate solution is a sodium silicate such as INJECTROL®U sold by Halliburton Services. The time delayed activator is a low molecular weight urea/formaldehyde resin. The urea/formaldehyde resin decomposes at high temperatures to form urea which then activates the setting of the silicate. Different resins decompose at different temperatures. Accordingly, one skilled in the art of polymers can select a suitable resin for a particular formation temperature.

The use of the time delayed activator allows for a controllable pump time before the system sets to a stiff gel. Accordingly, deep penetrations can be achieved in the gas cap to seal off unwanted gas coning and fingering.

The amount of solution necessary to treat a well is dependent upon a number of factors including the height of the zone, its porosity and its vertical permeability. For example, if a zone to be shut off is 16 feet high, has a 13% porosity, and only a small amount of vertical permeability, 100 barrels of solution are needed to penetrate to a radius of 9.26 feet as calculated from the formula:

$$V = (0.56)(\phi)(h)(r^2)$$

where $V$ = volume in barrels; $\phi$ = the porosity as a decimal; $h$ = height of the zone in feet; and $r$ = radius of penetration in feet.

If the maximum pump rate is 1.0 barrel per minute, it will take 1 hour and 40 minutes to inject the solution. Accordingly, the amount and type of activator must be chosen to permit all of the fluid to be injected before gelling occurs.

In practicing the present invention, the silicate solution is injected using standard injection techniques into the gas zone in the hydrocarbon bearing formation. Preferably, sufficient material is injected such that it penetrates to a radial distance of up to about 50 feet. The amount of material which must be injected will be dependent upon the height of the zone being treated, the porosity of the formation and its vertical permeability. After injection of the solution, the well is shut-in for a sufficiently long period of time to allow the silicate to set. This can be anywhere from a few hours to several days.

While the invention has been described with respect to the presently preferred embodiments, it will be appreciated by those skilled in the art that numerous changes or modifications could be made without departing from the spirit and scope of the invention. For example, other types of time delayed activators in addition to the one listed above could be used. Accordingly, the invention is to be construed in accordance with the appended claims rather than by the foregoing descriptions.

What is claimed is:

1. A method of preventing gas coning and fingering in a hydrocarbon bearing formation comprising:

injecting a silicate solution and a delayed activator comprising a low molecular weight urea/formaldehyde resin which decomposes to form urea at the conditions of a gas zone, through a well bore into a gas zone above an oil bearing zone under conditions such that the activator will cause the silicate to gel after a predetermined period of time to form an impermeable zone or layer above the oil bearing zone; and producing oil from said oil bearing zone through said well bore.

2. A method of reducing the flow of gas to an oil producing well from a gas cap in the top of an oil bearing formation comprising:

injecting a silicate solution and a delayed activator comprising a low molecular weight urea/formaldehyde resin which decomposes to form urea at the temperature and pressure conditions of the formation, into said gas cap under conditions such that the delayed activator causes the silicate to gel after a predetermined period of time to form an impermeable zone or layer above the oil bearing formation; and shutting in said well for a sufficient time to permit said silicate to gel.

* * * * *